July 5, 1932.   A. Y. DODGE   1,866,252
BRAKE
Filed May 31, 1930
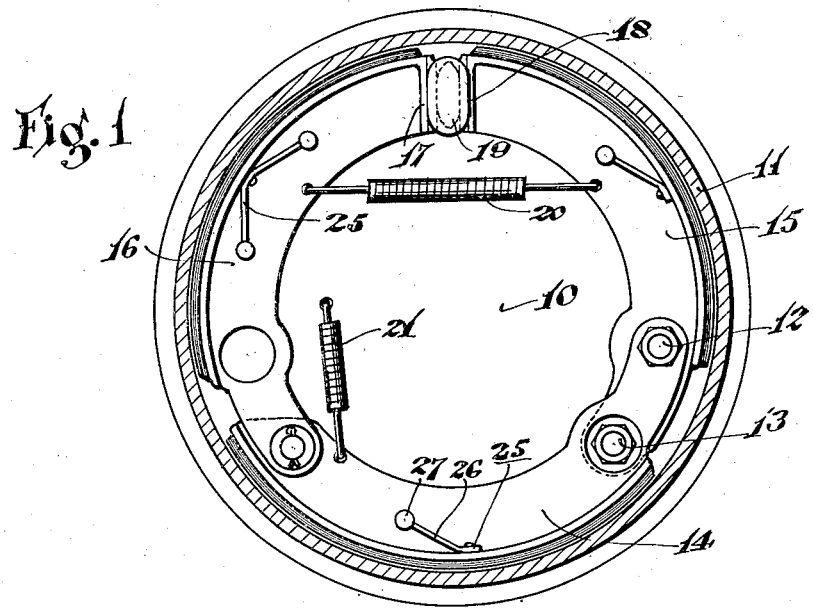
Fig. 1
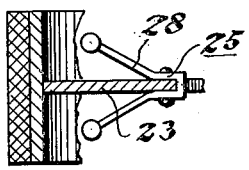
Fig. 3
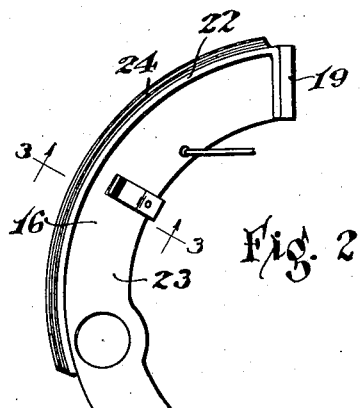
Fig. 2
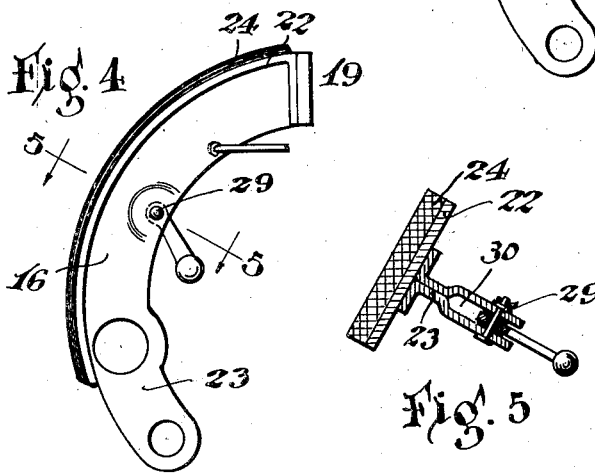
Fig. 4
Fig. 5
INVENTOR.
Adiel Y. Dodge
BY
D. W. McConkey
ATTORNEY Patented July 5, 1932

1,866,252

UNITED STATES PATENT OFFICE

ADIEL Y. DODGE, OF SOUTH BEND, INDIANA

BRAKE

Application filed May 31, 1930. Serial No. 458,711.

This invention relates to brakes and more particularly to vibration dampers therefor.

It is well established that audible vibrations in brakes are generally the result of deformation of the brake drum due to heat and other forces or changes in the co-efficient of friction caused by various foreign elements. These factors produce vibrations which at certain periods set up audible vibrations resulting in disagreeable sounds or noises. Vibrations in a brake are not infrequently set up in the brake shoes and transmitted to the drum through their frictional engagement therewith. Hence, it is desirable to check or damp the vibrations at their original source and with this in view applicant has provided damping means associated with the shoes.

An object of the invention is to provide a brake having means associated with the shoe for checking the vibrations therein.

A further object of the invention is to provide a brake having a vibratory means positioned on the shoes to check the vibrations set up therein.

A further object of the invention is to provide a brake having movable means associated with the shoes of the brake to check the vibrations therein.

Yet a further object of the invention is to provide a brake having associated with the shoes thereof an oscillatory member adapted to damp the vibrations set up in the shoes through the frictional engagement with the drum.

Other objects of the invention will appear from the following description taken in connection with the drawing, which forms a part of this specification, and in which:

Figure 1 is a side elevation of a brake embodying the invention;

Figure 2 is a side elevation of a brake shoe illustrating the invention as applied;

Figure 3 is a sectional view substantially on line 3—3, Figure 2;

Figure 4 is a side elevation of a brake shoe illustrating the modified form of the invention; and Figure 5 is a sectional view substantially on line 5—5, Figure 4.

Referring to the drawing for more specific details of the invention, 10 represents a stationary support such as a backing plate having associated therewith a drum 11. The backing plate is adapted to be secured to an axle housing or to a spindle as is the common practice, and the drum is adapted to be secured to a wheel, not shown.

The backing plate has positioned thereon suitable anchors 12 and 13. A secondary shoe 14 is positioned on the anchor pin 12, an auxiliary shoe 15 is positioned on the anchor pin 13, and connected to the secondary shoe is a primary shoe 16. The auxiliary shoe 15 and the primary shoe 16 are provided respectively with shoulders 17 and 18 between which is positioned a cam 19 for spreading the shoes. As shown, a return spring 20 is connected between the primary and auxiliary shoes and the secondary shoe is connected by a return spring 21 to a fixed support.

The shoes are of a conventional type, each having a rim 22, a web 23 and a lining 24 suitably secured to the rim. Riveted or otherwise secured to the rim of the shoe is a vibratory member 25. This vibratory member comprises an arm 26 having on the free end thereof a weight 27. It may be found desirable to construct the vibratory members with a plurality of arms, as most clearly shown in Figures 1 and 3, and in some instances, it may be found desirable to pivot the member on the shoe as indicated in Figures 4 and 5. In either instance, the vibratory member will, through the engagement of the frictional member or the shoe on which it is positioned, set up vibrations out of resonance with the vibratory waves of the shoe and these opposing waves will effectively destroy the vibrations before they reach an audible pitch.

In Figures 2 and 3, I have shown a modified form of the invention wherein the vibratory member 25 is secured to the web 23 of the shoe, with the arms straddling the web, as indicated at 28. Figures 4 and 5 illustrate a further modification wherein the vibratory member 25 is pivoted, as indicated at 29, in a pocket 30 in the web. In this modification, the vibratory member swings or oscillates and sets up a wave which is opposed to the wave produced by the frictional engagement of the shoe with the drum.

Both in the preferred and in the modified forms of the invention, the vibratory member has been shown and described as a flexible arm having a weight on the free end thereof. A structure of this type is particularly sensitive to any vibrations that may be generated in the friction member on which it is positioned. However, it is to be understood that these particular embodiments of the invention are not to be construed in any way as a limitation since it is obvious that vibrating members of any other design possessing sensitiveness may be employed effectively. The invention is, therefore, to be limited only as indicated by the scope of the appended claims.

Having thus described the various features of the invention, what I claim is new and desire to secure by Letters Patent is:

1. A brake comprising a brake shoe and a vibratory member secured to the shoe.

2. A brake comprising a brake shoe and a vibratory member secured to the web of the shoe.

3. A brake comprising a brake shoe and a vibratory member straddling the web of and secured to the shoe.

4. A brake comprising a brake shoe and a vibratory member associated therewith including a flexible arm and a weight upon the free end of the arm.

5. A brake comprising a brake shoe and a vibratory member secured to the shoe and having a plurality of arms provided with weights upon the free ends thereof.

6. A brake comprising a brake shoe and a vibratory member having a plurality of flexible arms and weights upon the free ends of the arms.

In testimony whereof I have hereunto signed my name.

ADIEL Y. DODGE.